United States Patent

[11] 3,523,507

| [72] | Inventor | Sol Dubin |
| | | 1 Rome St., Farmingdale, New York 11735 |
| [21] | Appl. No. | 758,385 |
| [22] | Filed | Sept. 9, 1968 |
| [45] | Patented | Aug. 11, 1970 |

[54] SKID FOR PALLETIZED LOADS HAVING INTEGRAL SHOCK ABSORBING MEANS
4 Claims, 3 Drawing Figs.

[52] U.S. Cl. ................................................ 108/51, 248/188.1, 248/119
[51] Int. Cl. ............................................... B51d 19/36
[50] Field of Search .................................. 108/51-58; 248/188, 119; 193/41, 39, 40; 280/32, 12, 25, 21, 28; 214/10

[56] References Cited
UNITED STATES PATENTS

| 1,749,270 | 3/1930 | Young | 108/58 |
| 2,546,830 | 3/1951 | McKim | 108/58 |
| 2,720,323 | 10/1955 | Hoiles | 214/10.5 |
| 2,828,931 | 4/1958 | Harvey | 248/119 |
| 2,900,157 | 8/1959 | Anke | 248/119 |
| 2,942,827 | 6/1960 | Edson | 108/54 |
| 3,338,589 | 8/1967 | Barton et al | 280/21 |

*Primary Examiner*— Bobby R. Gay
*Assistant Examiner*— Glenn O. Finch
*Attorney*— Charles E. Temko

ABSTRACT: An elongated skid having first and second ends, shock absorbing links attached to each of said ends, and to the undersurface of a pallet supported thereabove, and means interconnecting the skid with the undersurface of the pallet to permit pivotal motion of the skid relative to the pallet, and translational movement of the skid relative to the pallet in a direction perpendicular to the undersurface of the pallet, and preventing translational movement of the skid relative to the pallet in a direction parallel to the undersurface of the pallet.

Patented Aug. 11, 1970 3,523,507

SKID FOR PALLETIZED LOADS HAVING INTEGRAL SHOCK ABSORBING MEANS

This invention relates generally to the field of skids used in connection with palletized loads, and more particularly to an improved shock absorbing type for preventing damage to a load should the pallet be accidentally or intentionally dropped a substantial distance.

Conventional wood pallets are normally handled by fork lift trucks in moving one from one location to another, and are normally not intentionally dropped during loading or unloading. However, it is sometimes necessary to unload palletized cargo manually, in locations where fork lift trucks are not available, and very often, the unloading involves dropping of the load to a surface disposed below that upon which the load was initially placed. Since such loads are invariably quite heavy, it is difficult to control the descent into contact with the first-mentioned surface, and very often damage to the pallet and/or the load results.

It is therefore among the principal objects of the present invention to provide an improved skid which may be incorporated into flat pallet constructions capable of absorbing shocks involved during the intentional or unintentional dropping of a palletized load, thereby preventing damage either to the skid, the pallet, or the load.

Another object of the invention lies in the provision of improved structure of the class described which will linkably interconnect the pallet and the skid with shock absorbing mechanisms, which are brought into action upon the occurrence of relative movement between the skid and the pallet.

Yet another object of the invention lies in the provision of structure of the class described, in which the cost of fabrication may be of a reasonably low order, with consequent wide sale, distribution and use.

A further object of the invention lies in the provision of improved structure which, with relatively minor modification, may be incorporated into a variety of pallet constructions.

A feature of the disclosed embodiment lies in the fact that the shock absorbing mechanism may be immobilized to prevent flotation in transport.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
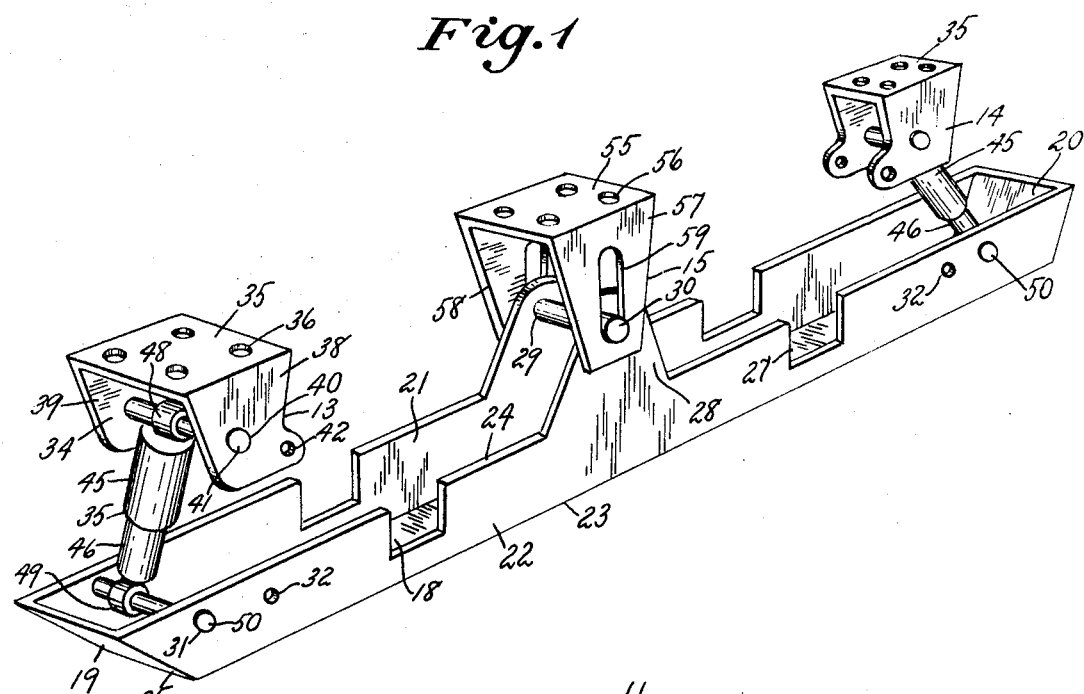
FIGURE 1 is a view in perspective of an embodiment of the invention.
Figure 2:
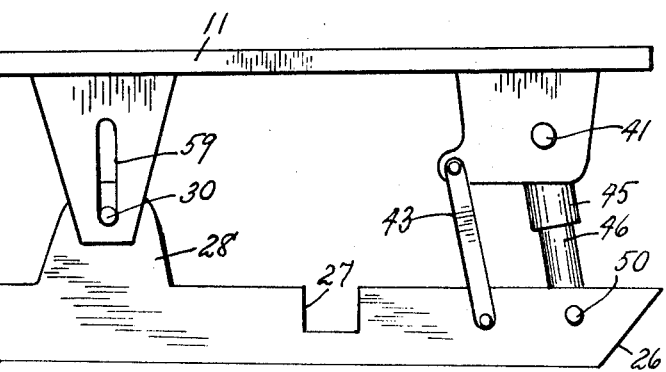
FIGURE 2 is a side elevational view, showing the device in interconnected relation with the undersurface of a conventional pallet.

In accordance with the invention, the device, generally indicated by reference character 10, is illustrated in the drawings in operative relation with a conventional pallet 11, of wood or metal construction, the details of which are well known in the art, and which need not be further considered herein. The device 10 comprises broadly: a skid element 12, first and second end link elements 13 and 14, respectively, and a centrally disposed link element 15.

The skid element 12 is preferably of metallic construction, and includes a bottom wall 18, end walls 19 and 20, and side walls 21 and 22. The side walls 21 and 22 are each bounded by a lower edge 23, and upper edge 24, as well as end edges 25 and 26, which interconnect with the above mentioned bottom and end walls 18-20, inclusive. The upper edge 24 is provided with cutouts 27 to permit passage of the engaging parts of a fork lift truck (not shown) whereby the device may be suitable for loading using mechanically assisted means. Generally medially disposed, is an upwardly extending tongue 28 having an opening 29 for the engagement at each end of a pivot pintle, whereby the skid element is interconnected with the link element 15.

The first and second end link elements 13 and 14 are similar, and symmetrically arranged, and accordingly, a description of one such link element will serve to describe the other.

The link element 13 includes a bracket member 34 pivotally interconnecting a shock absorbing unit 35. The bracket member 34 includes a base wall having openings permitting the bolting of the same to the undersurface of the pallet 11, and a pair of oppositely disposed side walls 38 and 39, each including a first aligned opening 40 for the engagement of a pintle 41, and second openings 42 for the engagement of link means 43 to prevent relative movement between the bracket member 34 and the skid element 12 during transport of the palletized load. The opposite end 44 of the link 43 engages an end opening 32 for this purpose.

The shock absorbing units 35 are of tubular olio type, including first and second coaxially arranged members 45 and 46 enclosing resilient coil spring and hydraulic shock absorbing means (not shown) of well known type. An upper connecting member 48 engages the pintle 41, and a lower connecting member 49 engages the pintle 50, the ends of which are disposed within openings 31 in the side walls 21 and 22 of the skid element 12.

The centrally disposed link element 15 includes a base wall 55 having openings 56 for the engagement of the undersurface of the pallet 11, and a pair of oppositely disposed side walls 57 and 58 each defining a slotted opening 59 and engaging the pintle 30 on the skid element 12.

Figure 3:
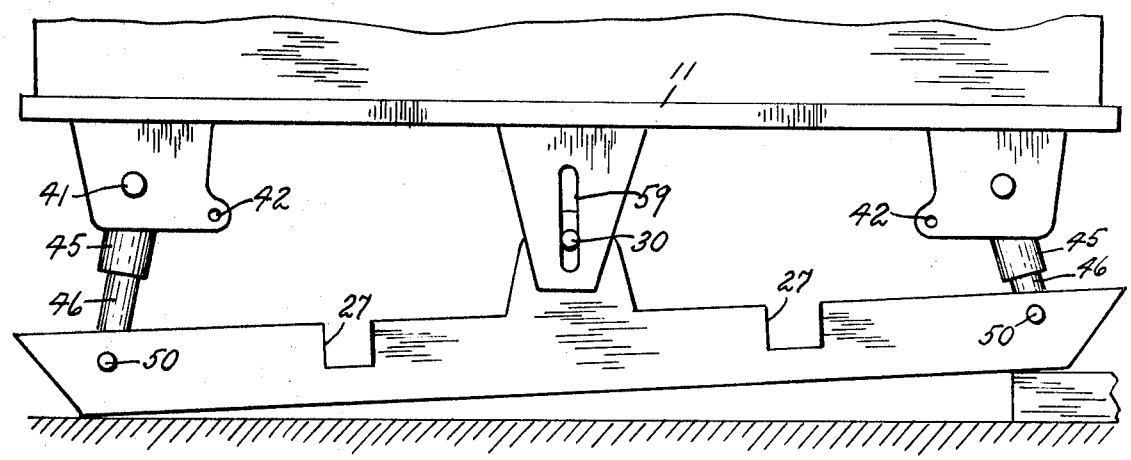
FIGURE 3 is a similar side elevational view showing flexing of the device relative to the pallet upon the occurrence of shock at one end of the skid.

Should the device be dropped to fall in a direction substantially perpendicular to the principal axis of the skid element 12, both shock absorbing units 35 will telescope to dissipate the shock. If, as illustrated in FIGURE 3, one end of the skid should first strike the surface upon which it is dropped, simultaneous pivoting and translational movement of the centrally disposed link element will permit the thus engaged end to separately absorb shock impact.

Preferably, the shock absorber units are adjustable, to permit use of the device with loads of varying weight, this being best established by the provision of a bypass metering valve of well known type (not shown).

I claim:

1. A skid construction for use with a palletized load comprising: an elongated skid element having first and second ends, first and second link elements, one at each end of said skid element, said first and second link elements having bracket means for interconnection with an undersurface of a pallet, each of said link elements including resilient energy dissipating shock absorbing means interconnecting said bracket and said skid element.

2. Structure in accordance with Claim 1, including a centrally disposed link interconnecting said skid element in extendable relation.

3. A skid construction for use with a palletized load comprising: an elongated skid element having first and second ends, first and second link elements, one at each end of said skid element, said first and second link elements having bracket means for interconnection with an undersurface of a pallet, each of said links including resilient energy-dissipating shock absorbing means interconnecting said bracket and said skid element, a centrally disposed link interconnecting said skid element in extendable relation, said centrally disposed link including a base wall interconnectable with said undersurface of said pallet, and means interconnecting with said skid element to permit relative motion between said pallet and said skid element along an axis substantially perpendicular to the plane of said pallet, and pivotal movement therebetween about a second axis perpendicular to said first mentioned axis.

4. Structure in accordance with Claim 3, said centrally disposed link including a pair of side walls, each interconnected with said base wall, and having a slotted opening substantially perpendicular to the plane of said base wall, said skid element including pintle means slidably engaging said slotted openings in said side walls.